(No Model.)
O. MUSSINAN, Jr.
PENCIL.
No. 386,891. Patented July 31, 1888.
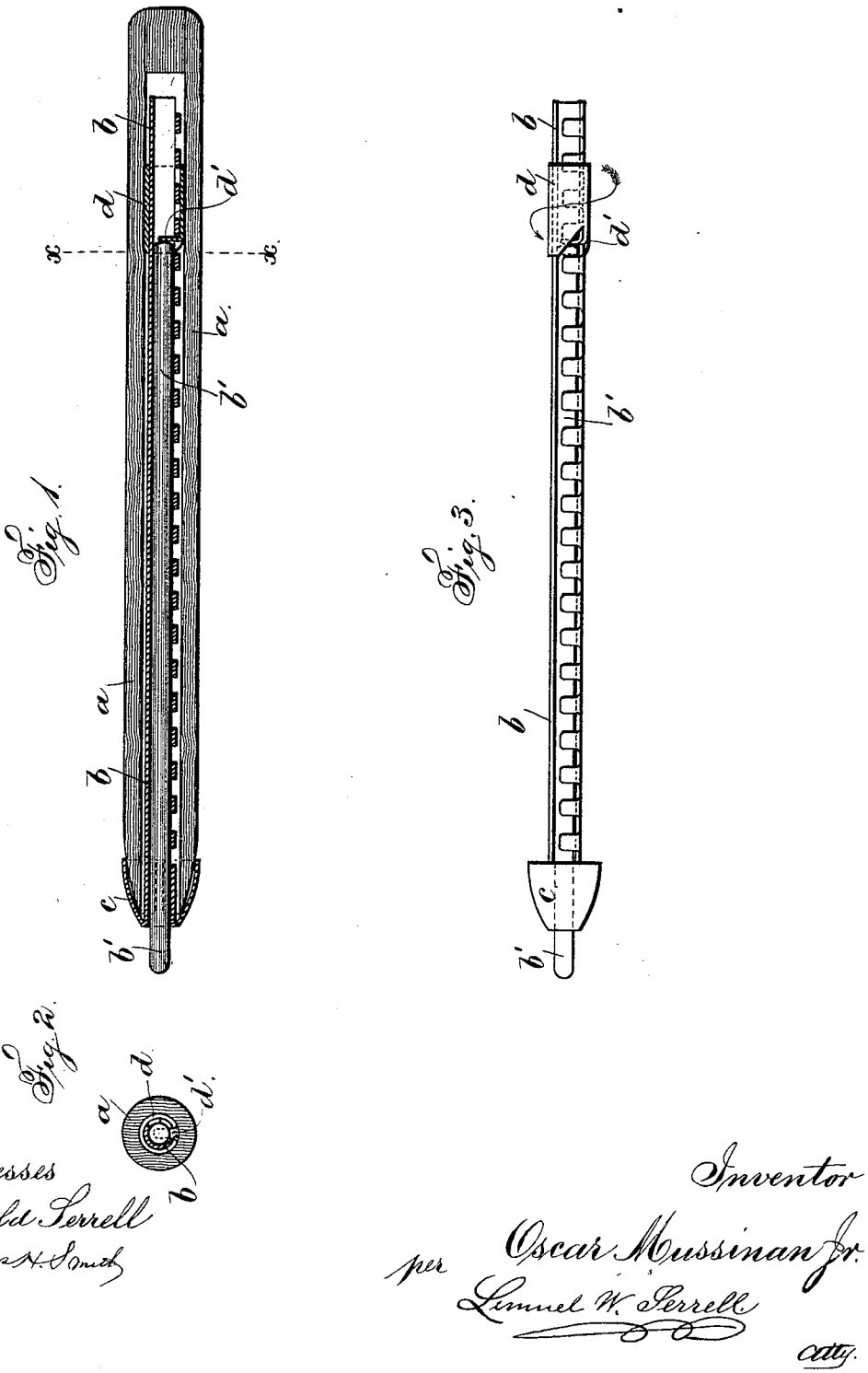
Witnesses
Harold Serrell
Chas H Smith
Inventor
Oscar Mussinan Jr.
per Lemuel W. Serrell
atty.

UNITED STATES PATENT OFFICE.

OSCAR MUSSINAN, JR., OF NEW YORK, N. Y., ASSIGNOR TO EBERHARD FABER, OF SAME PLACE.

PENCIL.

SPECIFICATION forming part of Letters Patent No. 386,891, dated July 31, 1888.

Application filed February 13, 1888. Serial No. 263,855. (No model.)

*To all whom it may concern:*

Be it known that I, OSCAR MUSSINAN, Jr., of the city, county, and State of New York, have invented an Improvement in Pencils; and the following is declared to be a full, clear, and exact description of the same.

My invention relates to that class of pencils wherein there is a separate removable ever-pointed lead, which lead can be replaced when broken or worn out by a new one, the lead-holder remaining the same.

I make use of a tubular body or sheath for the separate removable lead, a slotted tubular holder in which the lead is placed, which tubular holder is adapted to be received within the tubular body, the said tubular holder being provided with a conical cap fitting over the pointed end of the tubular body, and around said tubular holder is a sliding toothed sleeve, which sleeve is employed to push forward the lead and limit its backward movement, as hereinafter more fully described.

In the drawings, Figure 1 is a vertical longitudinal section of the pencil complete. Fig. 2 is a cross-section at the line $x\ x$, and Fig. 3 is a plan view of the slotted holder with the lead in place.

The tubular body or sheath $a$ is formed of wood, hard rubber, celluloid, or similar material, and is pointed at one end and finished or capped at the other end in any desired manner. The holder for the separate removable lead consists of a metal tube, $b$, slotted longitudinally for its entire length, and the metal edge upon one side of the slot is formed with teeth, and the tubular holder is of a size to exactly fit and receive the movable lead $b'$ sufficiently snugly to prevent it falling out. Upon one end of this slotted tubular holder $b$ is secured a conical metal collar, $c$, which corresponds internally with the exterior surface of the pointed end of the tubular body $a$. Surrounding the slotted tubular holder $b$ is a sliding toothed sleeve, $d$, which fits the same snugly, the tooth $d'$ of said sleeve being formed upon one end by cutting away the metal of the sleeve and bending the tooth inwardly. This tooth $d'$ is brought up against the end of the movable lead when the same is in the tubular holder $b$, and the sleeve can be revolved slightly, so as to bring its tooth $d'$ between the teeth of the toothed edge of the tubular holder. In this position the lead is locked and its backward movement in writing is prevented, and when the lead is worn down it is only necessary to remove the slotted tubular holder $b$ and its lead from the tubular body $a$, revolve the toothed sleeve $d$ slightly to free its tooth $d'$, and push the lead forward in the holder, and again turn the toothed sleeve $d$ to bring its tooth $d'$ between the teeth on the edge of the tubular holder to lock the lead in place, after which the lead and holder are again inserted within the tubular body, and the pencil is in condition for writing, as before.

The opening in the tubular body is larger than the tubular holder $b$ and large enough to receive the sleeve $d$, into which it fits snugly, the said holder being frictionally supported and held to the body $a$ by the sleeve $d$ and conical collar $c$, the friction of the sleeve $d$ acting to keep the tubular holder $b$ from falling out of the tubular body, and the conical collar $c$ acting to maintain the tubular holder centrally and prevent side-play, and the conical collar $c$ prevents the tubular holder $b$ being pushed into the tubular body when pressure is applied through the lead $b'$ against the tooth and sleeve $d\ d'$ in the act of writing. The pointed end of the tubular body $a$ may be divided by a longitudinal cut, so that it can yield slightly as the conical collar $c$ is pushed over it.

This form of pencil is neat and cheaply made, and is adapted to hold one lead after another, and it will last for a long time.

I am aware that a pencil has been made having a tubular body and a slotted tubular holder with a toothed edge for holding the lead, the lead in this case being moved forward by any pointed instrument and its position being determined by bending down into the tubular holder one tooth after another as the lead was worn off; but the tube cannot be used a second time, as it is destroyed when the lead is used up. This form of pencil is different from mine, and I herein distinctly disclaim any such device.

I claim as my invention—

1. The tubular sleeve $d$, having an inwardly-projecting tooth, $d'$, in combination with the slotted tubular pencil-lead holder $b$, having teeth upon one edge of the metal at the slot, and over which holder the sleeve is slipped, so as to hold the lead at any point to which it may be moved by the tooth $d'$ being brought into the notch between two teeth on the tubular holder, substantially as specified.

2. The combination, with the tubular body $a$, having a tapering end, of a tubular lead-holder passing freely into the tubular body, and a conical collar, $c$, on the tubular lead-holder, into which the tapering end of the tubular body passes, substantially as specified.

3. The combination, with the tubular body $a$, having a tapering end, of a tubular lead-holder passing freely into the tubular body, and a conical collar, $c$, on the tubular lead-holder, into which the tapering end of the tubular body passes, and a sleeve sliding on the slotted tubular lead-holder and having a tooth passing into the lead-holder at the end of the lead, substantially as specified.

Signed by me this 7th day of February, A. D. 1888.

O. MUSSINAN, JR.

Witnesses:
GEO. T. PINCKNEY,
HAROLD SERRELL.